United States Patent [19]
Duga

[11] Patent Number: 4,667,533
[45] Date of Patent: May 26, 1987

[54] POSITIVE DRIVE OVERRIDE MECHANISM
[75] Inventor: Robert J. Duga, Enfield, Conn.
[73] Assignee: Emhart Industries, Inc., Farmington, Conn.
[21] Appl. No.: 731,302
[22] Filed: May 7, 1985
[51] Int. Cl.$^4$ ............................. F16D 9/00; F16P 5/00
[52] U.S. Cl. ...................................... 74/584; 192/150; 83/543; 83/623
[58] Field of Search .................. 192/150; 74/584, 582, 74/581, 470, 412 TA; 403/290; 83/623, 543; 24/115 L, 136 A, 681, 652, 639, 596

[56] References Cited
U.S. PATENT DOCUMENTS

| 2,327,946 | 8/1943 | Ward ..................................... 74/584 |
| 2,516,642 | 7/1950 | Murphy ............................... 74/584 |
| 2,775,137 | 12/1956 | Chung ................................. 192/150 |
| 4,012,155 | 3/1977 | Morris ................................. 403/290 |

FOREIGN PATENT DOCUMENTS 765528 10/1980 U.S.S.R. .............................. 403/290

Primary Examiner—Rodney H. Bonck
Assistant Examiner—David A. Testardi
Attorney, Agent, or Firm—H. Samuel Kieser

[57] ABSTRACT

An override for a positive drive mechanism which includes a first bearing block which is fixedly secured to tie rods and a second bearing block which is secured to the tie rods through release and relatch means. The blocks are designed to couple to either a positive drive unit or a unit to be driven by the drive unit. When the driven unit encounters a solid obstruction, release and relatch means associated with the second bearing block will permit the tie rods to slide within the second bearing block, thereby allowing the driven unit to stop. The override mechanism is advantageous in that within a relatively small physical size when a high maximum preselected load in the mechanism is attained, the mechanism will release and apply no further load to the drive. Very long override strokes can be accommodated after which the device will reset at the end of each stroke.

5 Claims, 6 Drawing Figures

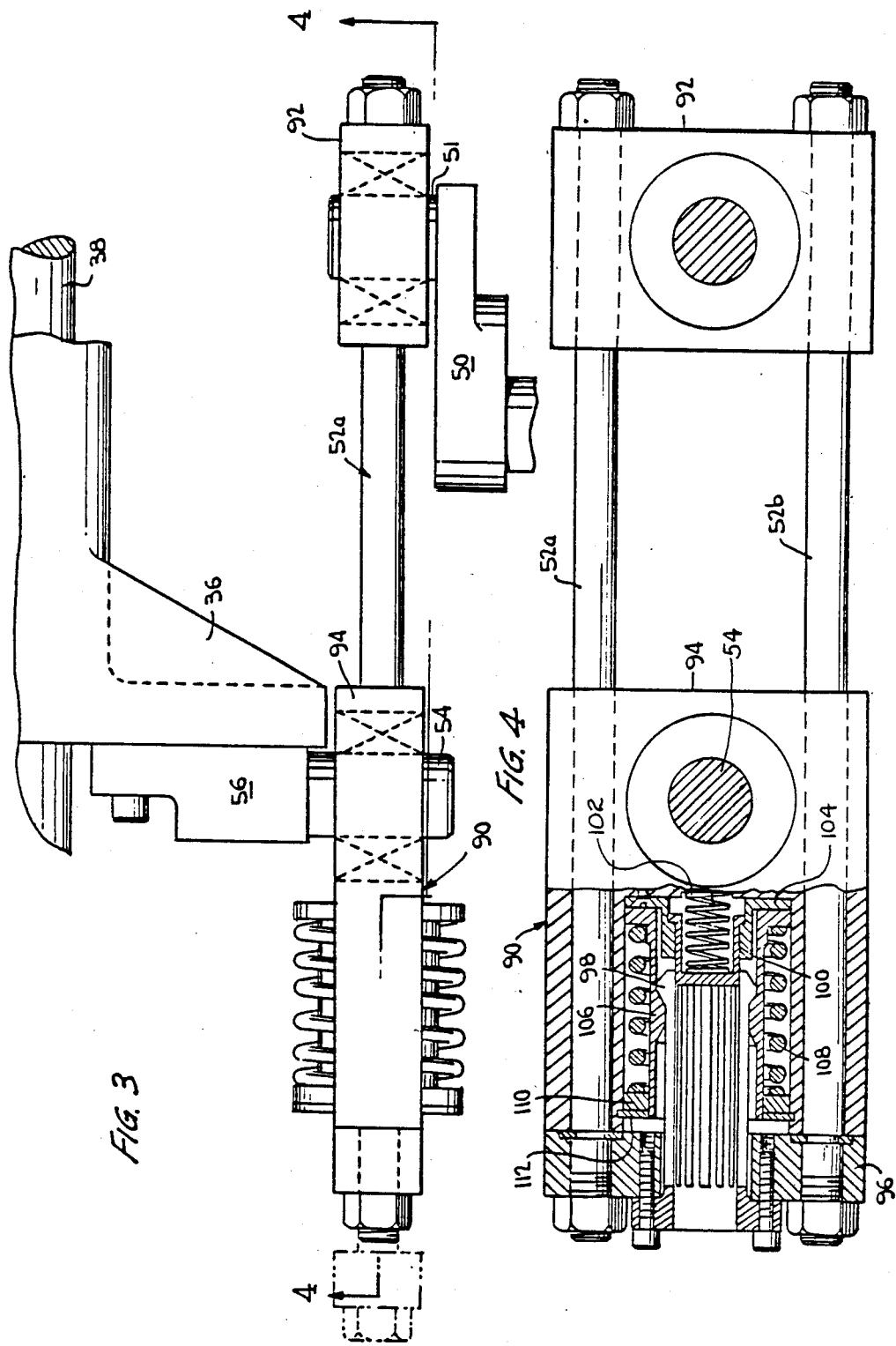

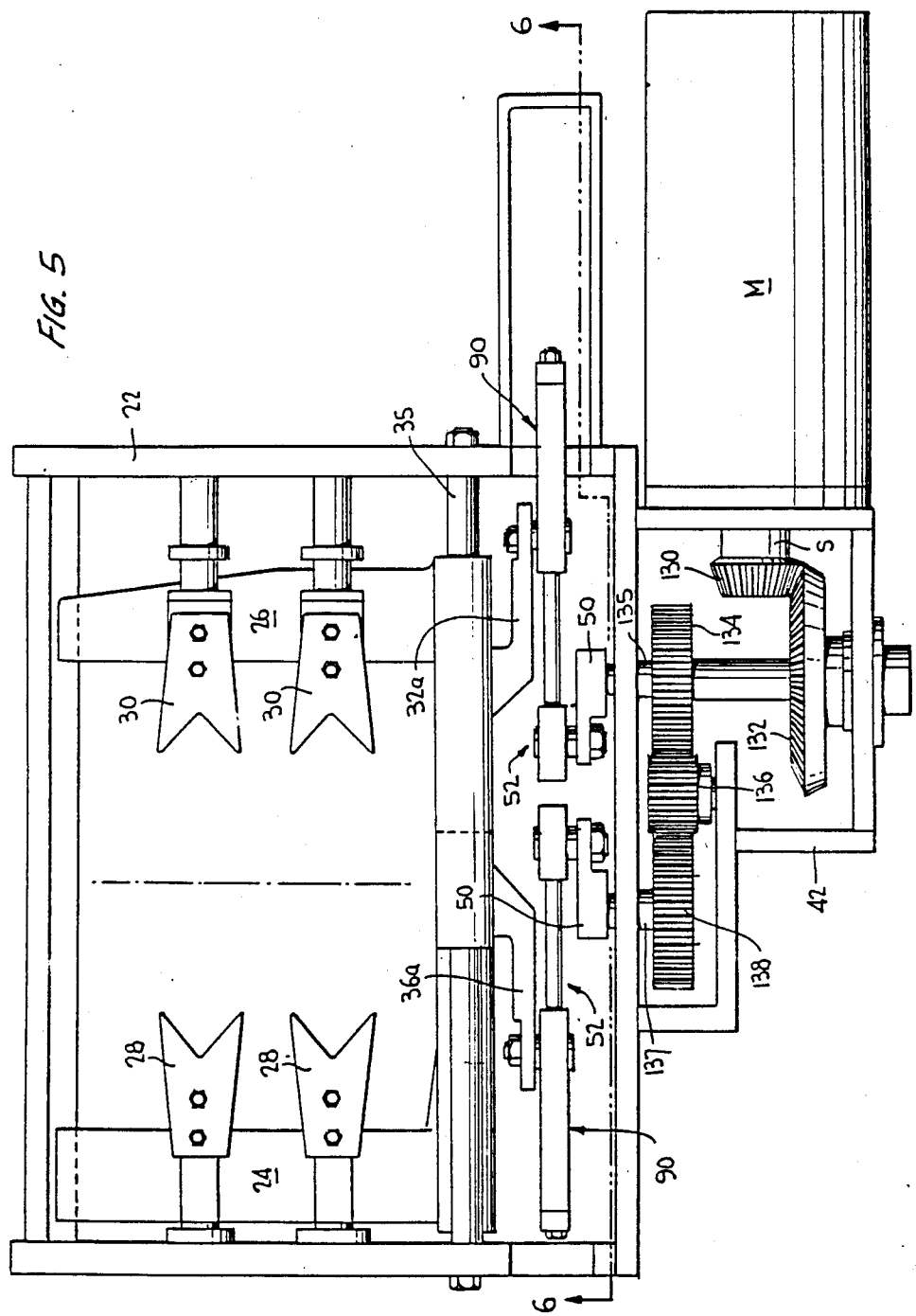

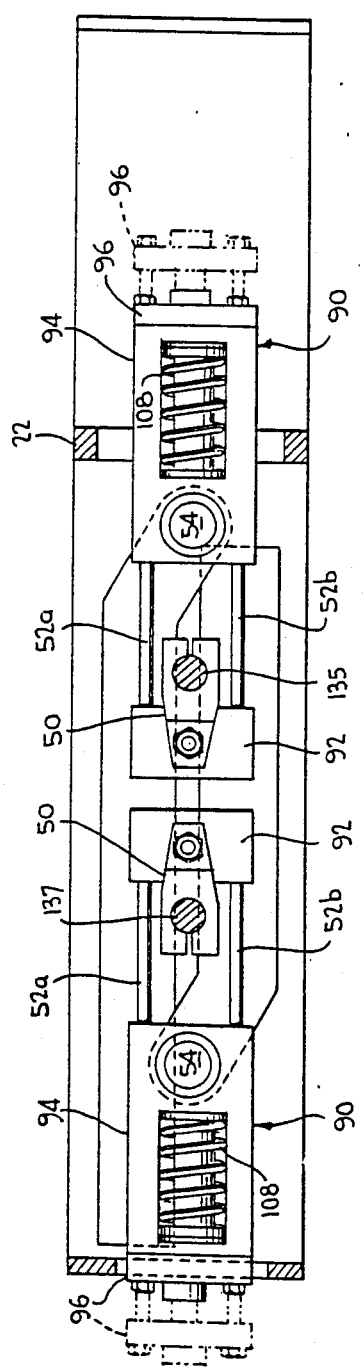

POSITIVE DRIVE OVERRIDE MECHANISM

This invention relates in general to a new and useful positive drive override mechanism, and more particularly to an improved override mechanism which allows stoppage of the motion of a rapidly moving work piece when the work piece strikes an obstruction without damaging the driving mechanism.

In a concurrently filed application in the names of Frederick W. Winzer and Robert L. Doughty entitled "Improved Crank Drive Mechanism for Straight Line Shear," assigned to the assignee of the present invention, there is disclosed a straight line shear for cutting glass runners into individual gobs which includes two slides mounted for guided movement towards and away from one another, and arranged in opposed relation. The slides carry cooperating blades. The slides are driven at high speed with rotary drive means incorparting a crank drive. In one embodiment of the shears disclosed in the aforesaid application, a single crank is coupled at one end through a linkage arm to one side carrying a shear blade of the straight line shears, with the second slide being carried by the first slide through a rack and pinion mechanism, providing guided movement of the slides towards and away from one another. In this embodiment the crank is coupled at its other end to a positive drive unit such as an electric servomotor.

In another embodiment of the invention disclosed in the aforesaid application, two cranks tied together by a gear train driven by an electric servomotor or other controller rotary power source are coupled through separate linkage arms to one each of the opposing slides of the straight line shears to provide guided movement of the slides towards and away from one another.

In straight line shear devices of the aforesaid type, at times the shears come in contact with a solid object such as a stone while cutting the glass runner which, because of the rapidly accelerating slides, can cause substantial damage to the positively driven mechanism or to the drive unit. Also, in the event a slide or blade becomes misaligned, the blades can contact each other rather than merely meeting to sever the glass runners, again causing substantial damage to the driven mechanism or to the drive unit, particularly in view of the high rates of speed of the mechanism.

There is a need, therefore, for a mechanism which can be easily installed in a direct drive linkage whereby when a solid object such as a stone or a misaligned blade is encountered the motion of a positively driven element will be stopped, preventing damage.

In accordance with the present invention, there is provided an override mechanism which can be readily attached to a positive drive mechanism to prevent damage to the positive drive mechanism in the event the shear blades strike an object such as a stone. The device is unique in that within a relatively small physical size, when a preselected maximum design load in the mechanism is attained, the device will release and apply no further load to the drive. Very long overload strokes can be accommodated, after which the device will reset at the end of each stroke.

The override mechanism of the present invention can be inserted in any connecting linkage between a positive drive unit and a driven device such as a shears. The mechanism will include two bearing and bearing blocks connected by rod means, one of the bearing blocks being fixedly connected to the rod means and the other bearing block being slideably connected to the rod means. The drive unit and the driven device are coupled to one or the other of the bearing blocks. A release-latch mechanism is secured downstream of the block which will permit the rod means to slide in the bearing block after a preselected load is reached. Accordingly, when an obstruction is met by the driven device, the block which is fixedly secured to the rod means and the rod means continue to move. However, the block slideably secured to the rod means will stop, thereby stopping movement of the driven device.

In the drawing, wherein throughout like numerals refer to like parts,

FIG. 3 is an enlarged view of a portion of FIG. 1;

FIG. 4 is a sectional view taken along line 4—4 of FIG. 3;

FIG. 5 is a plan view of an alternative embodiment utilizing a dual crank drive for straight line shears utilizing an override mechanism according to the present invention on each crank; and FIG. 6 is a sectional view taken along line 6—6 of FIG. 5.

Figures 1, 2:
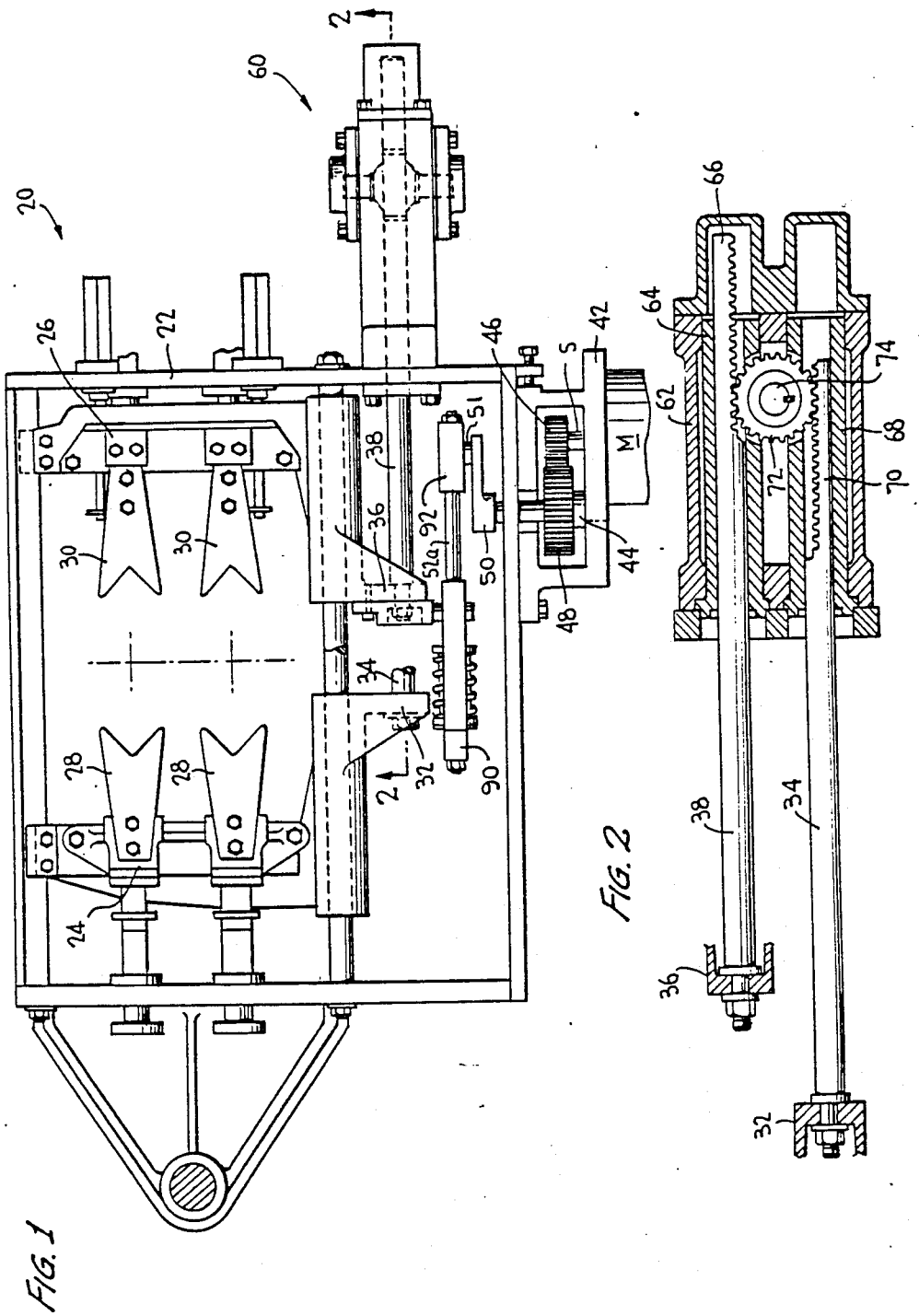
FIG. 1 is a plan view of a single crank drive for straight line shears utilizing an override mechanism of the present invention.
FIG. 2 is a section taken along line 2—2 of FIG. 1.

Referring now to the drawing in detail, reference is first made to FIG. 1 wherein there is illustrated a straight line shear generally identified by the numeral 20. This shear, in simple terms, includes a support or frame 22 which has suitable guides for a pair of opposed slides 24, 26 which are mounted within the support 22 for simultaneous reciprocation towards and away from one another. The slides 24, 26 carry blades 28, 30 which cooperate with one another for the purpose of shearing a glass runner to form gobs. The slide 24 has a bracket 32 to which there is connected rod 34. The slide 26 has a similar bracket 36 to which there is connected rod 38.

Also as shown in FIG. 1, support 22 has attached thereto a mounting frame 42 which carries a shaft 44 and an electric servomotor M. A shaft S on motor M is coupled to a spur gear 46 which drives gear 48 on shaft 44. A crank 50 is coupled at one end of its arm to the end of shaft 44. The other end of crank 50 is coupled through shaft 51 to bearing and block 92. Bearing and block 92 is coupled to one end of connecting rods 52a and 52b. Connecting rods 52a and 52b are, in turn, coupled through override mechanism, generally designated 90, to shaft 54. Shaft 54 is attached through block 56 to bracket 36.

An idler rack and pinion mechanism, generally designated 60, is connected to bracket 36 by rod 38 and to bracket 32 by rod 34. This mechanism includes a housing 62 having mounted therein a guide tube 64 in which there is guidedly mounted one end of rod 38. The terminal portion of rod 38 carries a rack 66. The housing 62 carries a second guide tube 68 for reciprocation of an end portion of rod 34. The end portion of end 34 is also provided with a rack 70 which opposes rack 66. A pinion 72 is positioned between the racks 66, 70, and is meshed therewith. The pinion 72 is keyed to a drive shaft 74 which is suitably rotatably journaled within the housing 62.

As best shown in FIGS. 3 and 4, connecting rods 52a and 52b are connected to crank 50 through bearing and bearing block 92. Connecting rods 52a and 52b are, in turn, connected through bearing and block 94 to shaft 54, which through block 56 and bracket 36 drives slide 26. Rods 52a and 52b are positively attached to block 92 and plate 96, and are slideable in block 94. Fingers 98 are attached to plate 96, the individual fingers being a single finger or set of multiple cantilevered beams. The fingers 98 can be deflected radially inward a significant amount with a relatively low load.

The fingers are prevented from moving radially inward by a retainer means 100 which is spring-loaded by a spring 102 against keeper 104 which is attached to block 94. The fingers are restrained outwardly by finger restraining means in the form of a spring seat 106 which is springloaded loaded against keeper 104 and block 94 by spring 108. The other end of override spring 108 is restrained by seat 110 and retainers 112. Override spring 108 is preloaded to near the maximum load that will be applied to blades 28, 30.

In operation of the device shown in FIGS. 1 through 4, motor M, which is a non-reversible electric servomotor, drives gear 48 through spur gear 46 which, in turn, will cause the rotation of crank 50. Crank 50, in turn, through connecting rods 52a and 52b will cause slide 26 to reciprocate. For each revolution of the crank, the blades of the shears will make one cut during which time the drive motor will make more or less revolutions depending upon the gear ratio selected for spur gear 46.

As is best shown in FIGS. 1 and 2, the movement of slide 24 will follow or be a slave to the movement of slide 26 as a result of idler rack and pinion mechanism 60 being tied through rod 38 to bracket 36, and rod 34 being tied to bracket 32.

With respect to the override mechanism, in the event blades 28, 30 strike a solid object such as a stone, block 94 is prevented from continued forward movement. Block 92 being attached to a positive drive continues in motion to the left toward block 94. This, in turn, carries fingers 98 and spring seat 106 which starts to compress the override spring 108. After moving a short distance to the left, the fingers will have cleared retainer 100 and in so doing are able to deflect radially inward and slide past spring seat 106. At this point the fingers then clear the seat and are free to move to the left unrestricted along with the connecting rods and bearing block 92 as shown in FIG. 3 in phantom lines. When the motion reverses, fingers 98 will eventually enter the spring seat and be deflected inward by the ramp on the seat. As they go over the ramp and are deflected inward, they contract retainer 100, pushing it back, thus allowing the fingers to relatch into position. When relatched, the spring-loaded retainer can move back into position and positively lock the mechanism until the next override condition occurs. As is apparent, therefore, the override mechanism prevents damage to the shear mechanism in the event a solid object is encountered by the shear blades.

Referring now to FIGS. 5 and 6, there is shown a second embodiment of the present invention utilizing a dual crank drive. In this embodiment each of slides 24 and 26 carrying blades 28 and 30 are positively driven by the drive unit power source such as the electric servomotor M through bevel gears 130 and 132 which drive the gear train comprising gears 134, 136, and 138. As shown, gears 134 and 138 are connected through shafts 135 and 137 to dual cranks 50. Dual cranks 50 are connected through linkages 52 and override mechanisms 90 directly to brackets 32a and 36a. These brackets 32a and 36a in carrying slides 24 and 26 are guided on guide rod 35. Each crank will make one revolution per cut during which time the drive motor again will make more or less revolutions depending upon the gear ratio selected for bevel gears 130 and 132. The override mechanism, in the event blades 28 or 30 strike an obstruction, will stop forward movement of the blades, preventing damage to the shear mechanism or to the drive unit.

Referring to the override mechanism, as will be apparent the mechanism attachment at blocks 92 and 94 could be reversed. Further, the fingers can be single leaf or multiple leaf, with the finger design being arranged for outward deflection rather than inward deflection as shown in FIG. 4.

The override mechanism of the present invention has numerous advantages, including a large override stroke with minimum space being required. Further, no load is produced after the maximum preselected allowable load has been attained. The mechanism permits a high load capacity and is positively reset at the completion of each stroke. As is apparent, the device can be designed to work as a compression or tension override mechanism, and has a relatively sensitive override load trip point. Additionally, the mechanism does not produce increasing loads as the override stroke increases, such as spring-only type override devices. As will also be recognized, the override mechanism can be attached to mechanisms other than the presently described straight line shears, such as a plunger drive.

As will be apparent to one skilled in the art, various modifications can be made within the scope of the aforesaid description. Such modifications being within the ability of one skilled in the art form a part of the present invention and are embraced by the appended claims.

It is claimed:

1. An override mechanism for a positive drive mechanism comprising a first bearing block and a second bearing block, each having means for coupling to either a positive drive unit or a unit to be driven by said drive unit, and tie rod means extending in a direction and having a first and second end, said first bearing block being fixedly secured to a first end of said tie rod means and said second block being secured proximite to said second end of said tie rod means through release and relatch means, said release and relatch means including plate means fixedly attached to said tie rod means and moveable with respect to said second bearing block, finger means cantileveredly attached to said plate means whereby said finger means can be deflected, finger restraining means moveably mounted in said second bearing block relative thereto in a direction parallel to said tie rod means, said finger means engaging said finger restraining means and being constrained from deflecting in one direction thereby, retainer means mounted in said second bearing block for restraining movement of said finger means in another direction, said retainer means being moveable relative to said second bearing block in the direction parallel to said tie rod means, spring means biasing said finger restraining means against said second bearing block, said retainer means preventing disengagement of said finger means with said restraining means until said finger restraining means has moved a predetermined distance relative to said retaining means against the bias of said spring means whereupon said finger means can move relative to said finger restraining means.

2. The override mechanism of claim 1 wherein said tie rod means includes two spaced-apart connecting rods.

3. The override mechanism of claim 2 wherein said finger means comprise a plurality of fingers cantilevered in a circle.

4. The override mechanism of claim 3 wherein said finger means deflect inwardly when said retaining means permits disengagement of said finger means with said finger restraining means and pressure is applied to move said finger means relative to said retaining means against the bias of said spring means.

5. The override mechanism of claim 1 wherein said retaining means is engageable by said finger means upon return of said finger means after said finger means disengages from said finger restraining means to move said retaining means against the bias of a spring member until said finger means engages said finger restraining means whereupon said retainer means moves under its spring bias into a position to restrain movement of said finger means.

* * * * *